Patented May 22, 1934

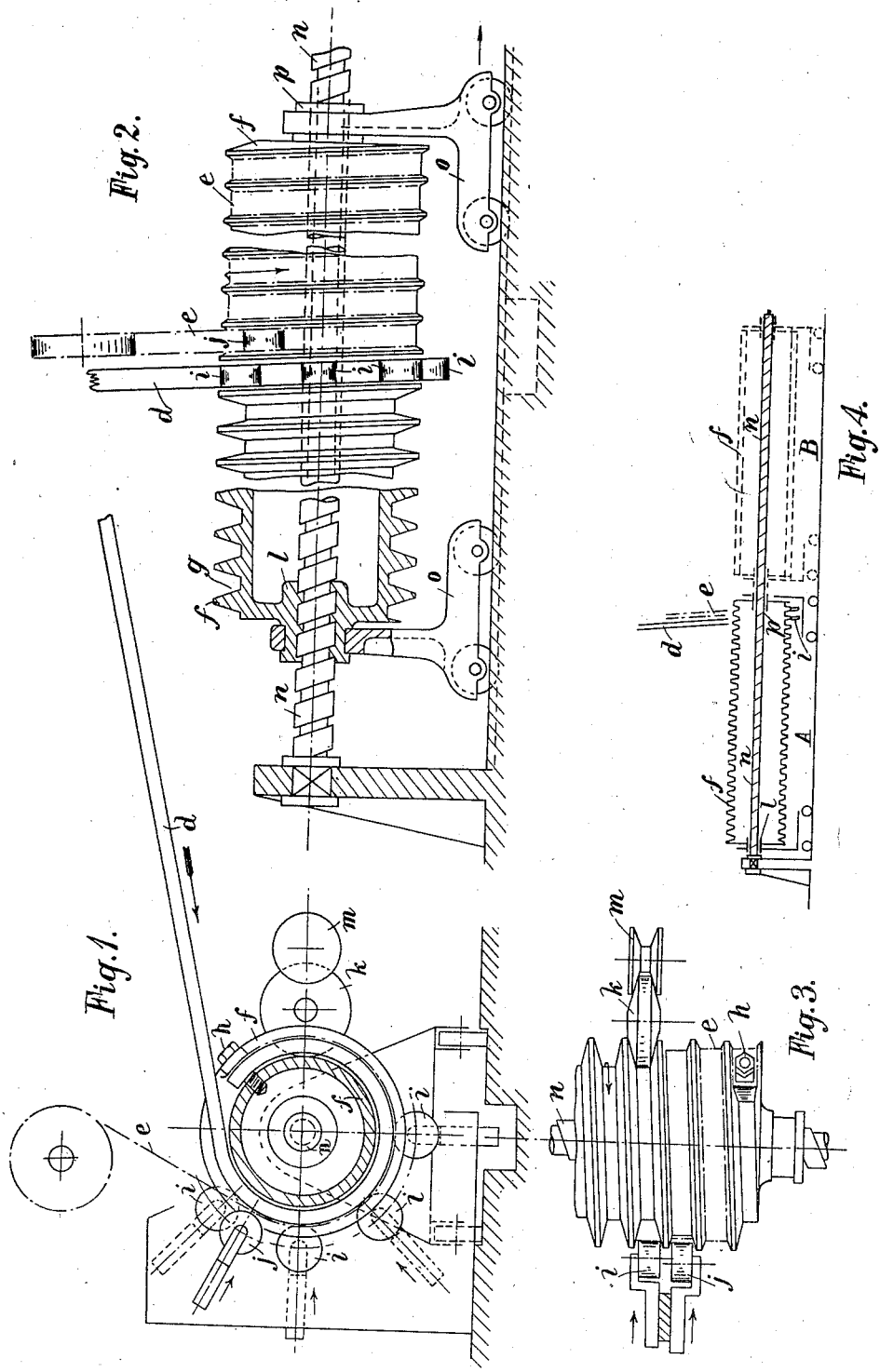

1,959,488

UNITED STATES PATENT OFFICE 1,959,488

METHOD OF AND APPARATUS FOR MANUFACTURING V-BELTS OF FINITE LENGTH

Johann Meyer, Berlin-Wilmersdorf, Germany

Application August 27, 1930, Serial No. 478,200
In Germany September 2, 1929

8 Claims. (Cl. 18—6)

The hitherto proposed method for manufacturing V-belts of finite length have the drawback that the length in which these belts can be manufactured is limited. If it be attempted to manufacture belts of considerable length, then the necessary apparatus for doing so becomes exceedingly large and expensive or if a compromise is made by the use of smaller apparatus, and for instance a 20 metre long V-belt be vulcanized in sections, then the uniformity and quality of the belt suffers. Moreover it is not possible in the known apparatus to maintain the belt during vulcanization under initial tension and curvature.

The method and apparatus according to the present invention enables very long V-belts to be vulcanized in the smallest space and with the application at the same time to the belts of an initial tension and curvature, in that the belt is vulcanized in a screw-threaded groove upon a roller.

The accompanying drawing illustrates means for carrying out the method according to the present invention in Figures 1 to 4, in which Fig. 1 is a sectional end view of the apparatus;
Fig. 2 is a side view thereof, with parts in section;
Fig. 3 a plan view thereof; and Fig. 4 illustrates the mode of operation thereof.

The V-belt $d$ illustrated by way of example is of trapezoidal cross section and at its commencement is secured by means of the screw $h$ in the trapezoidal screw-threaded groove $g$ of the roller $f$ and is pressed therein by rollers $i$. A steel band $e$, which is unwound from a spool and is also pressed upon by a small roller $j$, forms the outer closure of the upper width of the V-belt. This band $e$ is secured to the roller $f$ by the screw $h$ at the time the belt $d$ is being secured.

The roller $f$ is for example revolved by means of a motor through the medium of the pulley $m$ and the friction roller $k$ which engages in the screw-threaded groove $g$. Instead of an intermediate roller $k$ a V-belt can of course also be used. The axial movement which produces the feed motion of the roller $f$ is produced by means of a nut $l$ which is rigidly connected with one end of the roller $f$ and is threaded upon the stationary and non-rotatable spindle $n$ mounted in fixed bearings, said spindle having a screw-thread, the pitch of which is equal to the pitch of the screw-threaded groove $g$. The other bearing $p$ of the roller is not provided with a screw-thread. The actual journal bearings of the roller $f$ are mounted in travelling stands $o$.

The effective diameter of the screw-threaded groove $g$ of the roller $f$ is preferably so dimensioned that it is twice as great as the actual diameter of the smallest belt pulley to be used in connection with the belts manufactured. By this means the tension and compression forces acting on the outermost layers of the V-belts, when the belt is passing over the smallest curvature and over the straight runs, are equal to one another and are as small as possible.

The mode of operation of the apparatus for manufacturing the V-belt according to the present invention is illustrated in Figure 4, which shows the screw-threaded roller $f$ in the two positions A and B. In the position A the roller is empty.

During the filling of the screw-threaded groove with the V-belt the roller travels to the right and when it has been completely wound upon it occupies the position B.

What I claim is:

1. Apparatus for manufacturing V-belts comprising in combination a cylindrical member having a peripheral helical groove of wedge-section, means cooperating with the member for applying a V-belt to said groove, a closure for the peripheral helical groove in the form of a flexible metallic band, and means cooperating with the member for applying the band to close the groove after the arrangement of the belt therein.

2. Apparatus as claimed in claim 1, wherein means is provided for rotatably mounting the member about its longitudinal axis during the winding of the belt and band, each revolution of the member causing axial displacement corresponding to the pitch of the groove, while the means for applying the belt and band are stationary with respect to the member.

3. Apparatus as claimed in claim 1, wherein means is provided to rotatably mount the member, and means for rotating said member including a friction drive engageable in the threaded groove.

4. Apparatus as claimed in claim 1, wherein means is provided for rotatably mounting the member and moving it longitudinally at its axis including combined internally threaded bearings and journalling portions, a stationary threaded shaft upon which said bearings are engaged, and traveling trucks including bearings in which the journalling portions are rotatably mounted.

5. Apparatus as claimed in claim 1, including operating means for the member during the winding on of the V-belt and the metal band whereby the member is turned about its longitudinal axis and for each revolution is displaced axially a distance corresponding to the pitch of the groove so that the place where the belt and the metal band are remains stationary.

6. Apparatus as claimed in claim 1, characterized by the feature that the member is driven by means of a stationary friction drive engaging in the helical groove.

7. Apparatus as claimed in claim 1, wherein the helical groove of the member has twice the radius of curvature of the smallest pulley which can be used for the V-belt made thereon.

8. A method of manufacturing V-belts from rubberized fabric consisting in first stretching and curving a strip of raw material, then coiling the belt thus formed into a helical form, then enclosing and exerting a uniform pressure throughout the length of the coil belt, and finally vulcanizing the coil belt while maintaining it under pressure.

JOHANN MEYER.